US006938508B1

(12) United States Patent
Saagge

(10) Patent No.: US 6,938,508 B1
(45) Date of Patent: Sep. 6, 2005

(54) VENTILATED CLUTCH HAVING EXHAUST HUB

(75) Inventor: Darin Saagge, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 95 days.

(21) Appl. No.: 10/369,184

(22) Filed: Feb. 19, 2003

(51) Int. Cl.[7] .............................................. F16H 57/04
(52) U.S. Cl. ..................................... 74/93; 192/113.23
(58) Field of Search ............................... 474/8, 17, 18, 474/28, 93; 192/93 A, 113, 113.1, 113.23, 192/113.24

(56) References Cited

U.S. PATENT DOCUMENTS

| | | | |
|---|---|---|---|
| 1,372,700 A | | 3/1921 | Kimble |
| 1,385,396 A | | 7/1921 | Rayburn |
| 1,388,865 A | * | 8/1921 | Kimble .......................... 474/93 |
| 1,443,541 A | * | 1/1923 | Kimble .......................... 474/93 |
| 2,953,032 A | | 9/1960 | Ruess .......................... 74/230.6 |
| 3,618,412 A | * | 11/1971 | Schmid ........................... 474/8 |
| 3,861,229 A | | 1/1975 | Domaas ................. 74/230.17 E |
| 3,943,785 A | | 3/1976 | Percifield ................... 74/242.12 |
| 3,965,766 A | * | 6/1976 | Luenberger ..................... 474/37 |
| 4,395,249 A | | 7/1983 | Prasad et al. ................... 474/93 |
| 4,493,677 A | | 1/1985 | Ikenoya .......................... 474/93 |
| 4,509,933 A | * | 4/1985 | Miranti et al. ................. 474/93 |
| 4,530,680 A | * | 7/1985 | Miranti, Jr. .................... 474/93 |
| 4,531,928 A | | 7/1985 | Ikenoya .......................... 474/93 |
| 4,555,239 A | * | 11/1985 | Miranti, Jr. .................... 474/93 |
| 4,629,444 A | * | 12/1986 | Miranti, Jr. .................... 474/93 |
| 4,631,977 A | | 12/1986 | Kawashima ............... 74/606 A |
| 4,671,782 A | | 6/1987 | Ochiai et al. ................... 474/93 |
| 4,697,665 A | | 10/1987 | Eastman et al. ............. 180/230 |
| 4,712,629 A | * | 12/1987 | Takahashi et al. .......... 180/68.1 |
| 4,905,461 A | * | 3/1990 | Heuer ......................... 56/12.8 |
| 5,967,286 A | | 10/1999 | Hokanson et al. ....... 192/110 R |
| 5,976,044 A | | 11/1999 | Kuyama ....................... 474/93 |
| 6,176,796 B1 | * | 1/2001 | Lislegard ...................... 474/93 |
| 6,267,700 B1 | | 7/2001 | Takayama .................... 474/93 |

FOREIGN PATENT DOCUMENTS

JP 10-252849 A * 9/1998 .............. F16H 9/12

* cited by examiner

Primary Examiner—David A. Bucci
Assistant Examiner—Vicky A. Johnson
(74) Attorney, Agent, or Firm—Fredrikson & Byron, P.A.

(57) ABSTRACT

The invention provides for cooling an endless belt in a continuously variable transmission (CVT). The CVT is comprised of a drive clutch, a driven clutch, and an endless belt disposed about the drive and driven clutches. Both the drive and driven clutches include an axially stationary sheave and an axially movable sheave. A central hub extends from an inner surface of at least one of the sheaves, and further includes at least one bore. The one bore defines an air path extending from an outer face of the hub through the one sheave to the outer face of the one sheave. At least one recessed channel is located on an inner surface of at least one of the sheaves. The one recessed channel defines an air path around a side of the endless belt in contact with the inner face of the one sheave. The invention will cool the belt as it rides about the drive clutch and driven clutches. In addition, the invention will provide at least one reduced-slip sheave surface for the belt in the CVT.

16 Claims, 8 Drawing Sheets

VENTILATED CLUTCH HAVING EXHAUST HUB

TECHNICAL FIELD

The invention relates to continuously variable transmissions, such as those used in snowmobiles, and, in particular, to the drive and driven clutches that function thereon.

BACKGROUND OF THE INVENTION

Split sheave continuously variable transmissions (CVTs) are used in a variety of recreational type off-road vehicles such as snowmobiles, all-terrain vehicles (ATVs), golf carts, and the like. CVTs, as their name implies, do not require shifting through a series of forward gears, but rather provide a continuously variable gear ratio that automatically adjusts as the vehicle speeds up or slows down, thus providing relatively easy operation for a rider. This automatic adjustment mechanism is advantageous to the rider because he need not be bothered by shifting gears for increasing or decreasing vehicle speed. However, this mechanism is also disadvantageous because, by its very function, the mechanism produces external stress to an endless belt that is utilized within the CVT. This external stress eventually causes the belt to break down, with the belt being torn apart or shredded.

Typically, CVTs are comprised of a drive clutch, a driven clutch, and the endless belt disposed about the clutches. The driven clutch includes a pair of opposed sheaves, which together define a generally V-shaped "pulley" within which the belt rides. The drive clutch is similarly configured with a pair of opposed sheaves.

As previously mentioned, while the operation of the CVT allows the rider to not be concerned with shifting gears, it also promotes external stress to the belt, eventually resulting in the belt breaking down and having to be replaced. While this is a well-known occurrence, it is also a general inconvenience for the rider, since he subsequently has to spend time and money buying and replacing the belt. If a CVT could be configured to somehow increase the operational lifetime of the belt running therein, it would be very beneficial to the rider and a valuable marketing tool for manufacturers of vehicles that utilize CVTs.

SUMMARY OF THE INVENTION

The invention provides apparatus for cooling an endless belt in a clutch of a CVT. As previously mentioned, the CVT is comprised of a drive clutch, a driven clutch, and the endless belt disposed about the drive and driven clutches. The invention will cool the belt as it rides about the drive clutch and driven clutches. In addition, an embodiment of the invention provides apparatus for providing a reduced-slip surface for the belt to contact in a clutch of a CVT. Normally, as the belt rides about the drive and driven clutches, the belt contacts inner surfaces of the clutches. An embodiment of the invention will reduce belt slippage across the inner surfaces of the clutches.

One apparatus of the invention includes a continuously variable transmission, which is comprised of a drive clutch rotatable about a central axis and having an input shaft, a driven clutch rotatable about a central axis and having an output shaft, and an endless belt disposed about the drive and driven clutches. The drive and driven clutches are each comprised of opposing sheaves including an axially stationary sheave and an axially movable sheave, of which each sheave has an inner face and an outer face. The continuously variable transmission further comprises a clutch ventilation system comprising one of the sheaves. A central hub extends from the inner face of the one sheave towards the opposing sheave. The central hub includes a bore that provides an air path from the outer face of the one sheave through the one sheave to an outer face of the central hub.

Another apparatus of the invention includes a continuously variable transmission, which is comprised of a drive clutch rotatable about a central axis and having an input shaft, a driven clutch rotatable about a central axis and having an output shaft, and an endless belt disposed about the drive and driven clutches. The drive and driven clutches are each comprised of opposing sheaves including an axially stationary sheave and an axially movable sheave, of which each sheave has an inner face and an outer face. The continuously variable transmission further comprises a clutch ventilation system comprising one of the sheaves. The inner face of the one sheave has at least one recessed channel. The channel is positioned to provide a passage for air to flow around a side of the endless belt in contact with the inner face of the one sheave.

Another apparatus of the invention includes a continuously variable transmission, which is comprised of a drive clutch rotatable about a central axis and having an input shaft, a driven clutch rotatable about a central axis and having an output shaft, and an endless belt disposed about the drive and driven clutches. The drive and driven clutches are each comprised of opposing sheaves including an axially stationary sheave and an axially movable sheave, of which each sheave has an inner face and an outer face. The continuously variable transmission further comprises a clutch ventilation system comprising at least one of the drive or driven clutches. A central hub extends from the inner face of the axially movable sheave towards the axially stationary sheave of the at least one drive or driven clutch. The central hub includes a bore. The inner face of at least one of the axially movable or axially stationary sheaves of the at least one drive or driven clutch includes at least one recessed channel positioned to provide a passage for air to flow around a side of the endless belt in contact with such inner face of the sheave. The bore and the recessed channel provide an air path from the outer face of the axially movable sheave, through the axially movable sheave, through the bore, through the recessed channel around the side of the endless belt and past an outer radial end of the endless belt.

DETAILED DESCRIPTION OF THE INVENTION

Figure 1:
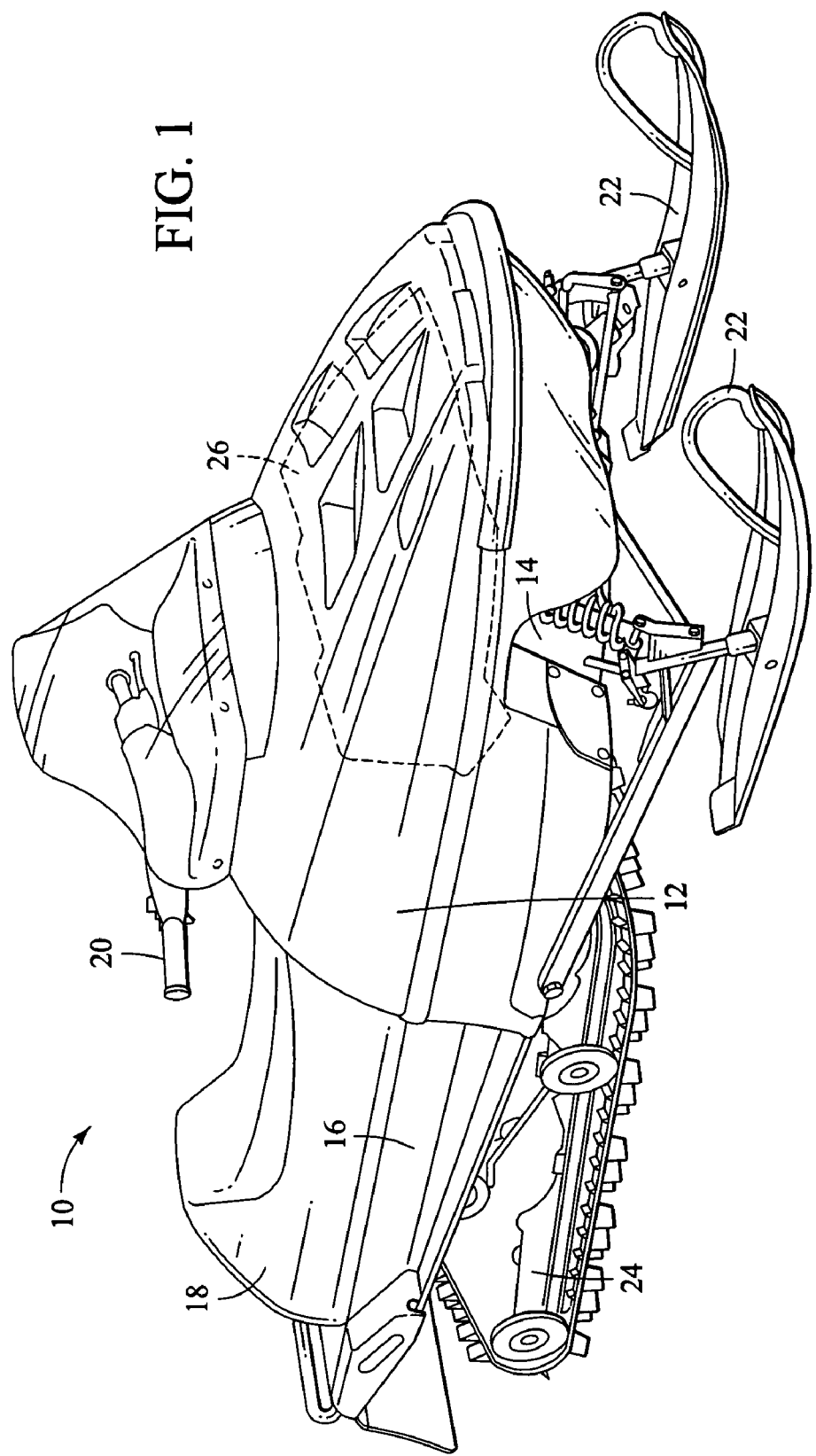
FIG. 1 is a perspective view of a snowmobile constructed in accordance with one embodiment of the invention.

The following detailed description is to be read with reference to the drawings, in which like elements in different figures have like reference numerals. The drawings, which are not necessarily to scale, depict selected embodiments, but are not intended to limit the scope of the invention. It will be understood that many of the specific details of the vehicle incorporating the system illustrated in the drawings could be changed or modified by one of ordinary skill in the art without departing significantly from the spirit of the invention. The function and operation of continuously variable transmissions (CVTs) are well known (see e.g., U.S. Pat. No. 3,861,229, Domaas, the teachings of which are incorporated herein by reference) and need not be described in detail. The CVT of the invention is designed for use on vehicles such as snowmobiles and ATVs, however it may be used on such other vehicles as golf carts and the like.

A snowmobile 10 having a system in accordance with one embodiment of the invention is illustrated in FIG. 1. The snowmobile 10 includes a body assembly 12 made up of a number of parts which may be formed of suitable materials that cover and protect a support frame or chassis 14. The body assembly 12 further includes a rear body portion 16 that accommodates a seat 18 adapted to carry one or more riders in straddle fashion. A handlebar assembly 20, positioned forwardly of the seat, is conventionally connected to a pair of front skis 22 for steering the snowmobile. The skis 22 are supported by a suitable front suspension system that is connected to the chassis 14. Rearwardly of the front skis 22 and beneath the seat 18, the chassis 14 suspends an endless track assembly 24 by a suitable suspension. The endless track 24 is driven by an internal combustion engine indicated generally by reference numeral 26 that is supported by the chassis 14 and located in an engine compartment within the body assembly 12 towards the front of the snowmobile 10. Positioned proximate to the engine, supported by the chassis 14, and located within the body assembly 12 is also a CVT (not shown).

Figure 2:
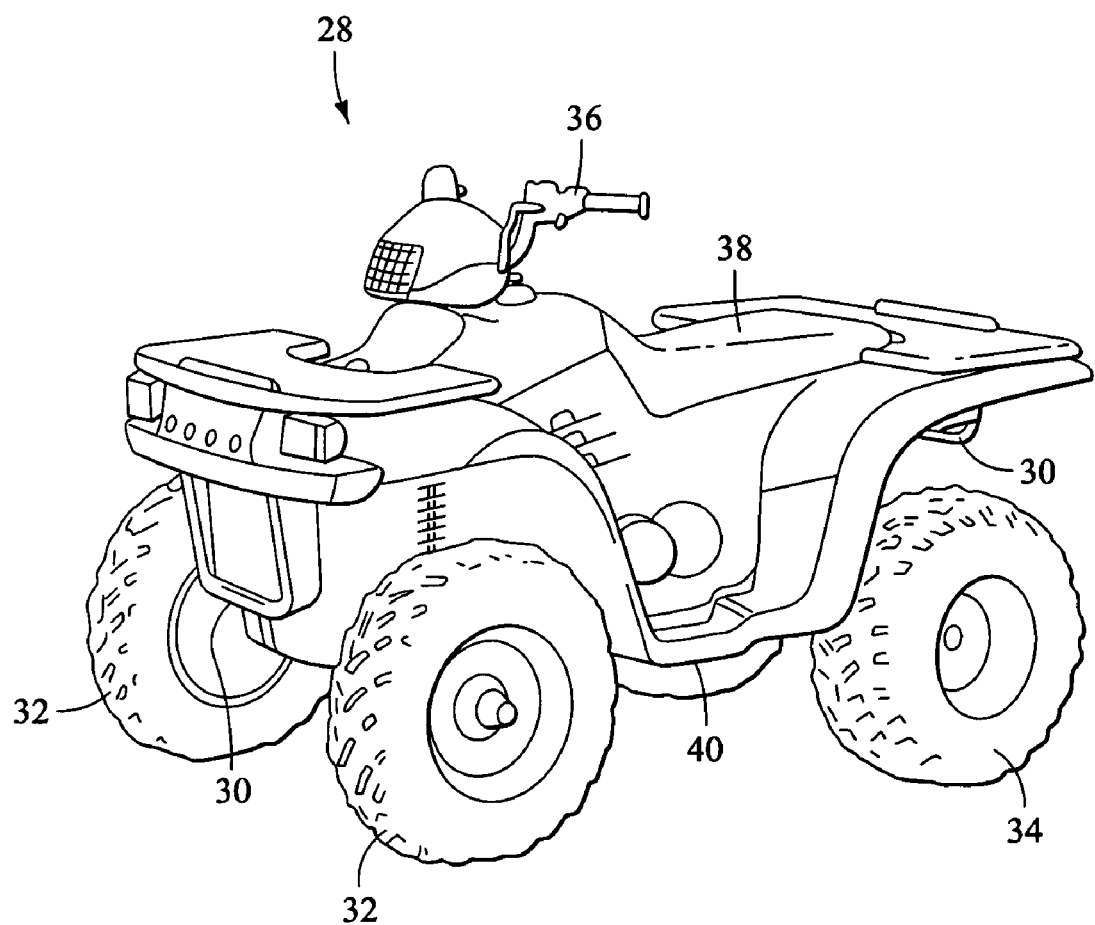
FIG. 2 is a perspective view of an ATV constructed in accordance with one embodiment of the invention.

An ATV 28 having a system in accordance with one embodiment of the invention is illustrated in FIG. 2. The ATV includes a chassis, designated generally by reference numeral 30, to which the various systems and components of the vehicle are attached. These components include front wheels 32, rear wheels 34, handlebars 36 connected by a suitable steering linkage to the front wheels 32 for steering the vehicle, and a straddle-type seat 38 upon which the rider sits. An engine and a CVT are carried on the chassis 30, generally beneath the straddle-type seat 38 and substantially between a pair footrests (only the left footrest 40 is visible in FIG. 2).

Figure 3:
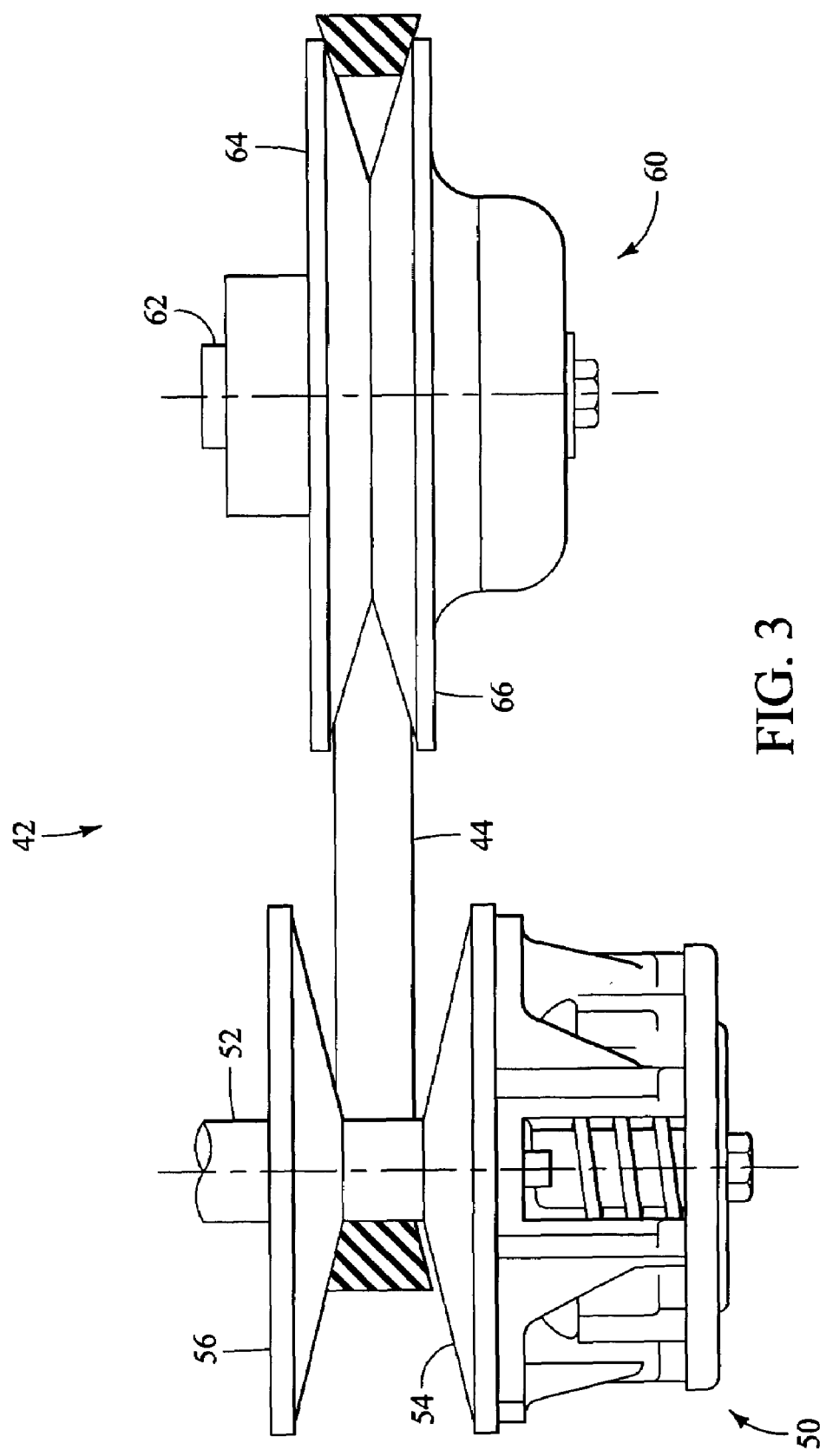
FIG. 3 is a top view of a continuous variable transmission.

FIG. 3 illustrates the features of a CVT suitable for use with vehicles such as those described above. The CVT 42 includes a drive clutch 50 having a drive shaft 52, a driven clutch 60 having a driven shaft 62, and an endless belt 44 disposed about the drive and driven clutches 50 and 60 respectively. As indicated previously, the driven clutch 60 includes a pair of opposed sheaves which together define a generally V-shaped "pulley" within which the belt 44 rides. One of the sheaves 64 is axially movable (i.e., movable in the direction parallel to a central axis of the driven shaft 62), and the other sheave 66 is axially stationary. The drive clutch 50 is similarly configured with a pair of opposed sheaves, one being axially movable 54 and the other being axially stationary 56. The drive and driven clutches 50 and 60 respectively could very well be referred to as drive and driven clutch assemblies, as each clutch is actually an assembly of corresponding opposed movable and stationary sheaves. However, to avoid any confusion or inconsistency, the terms "drive clutch" and "driven clutch" will be used herein throughout. Also, when the terms "radial" or "radially" are used herein, the terms are generally in reference to a distance or orientation perpendicular to a central axis of one of the clutches (i.e., the central axis of either the drive shaft 52 or the driven shaft 62). In addition, when the terms "axial" or "axially" are used herein, the terms are generally in reference to a distance or orientation parallel to the central axis of one of the clutches.

Figure 4:
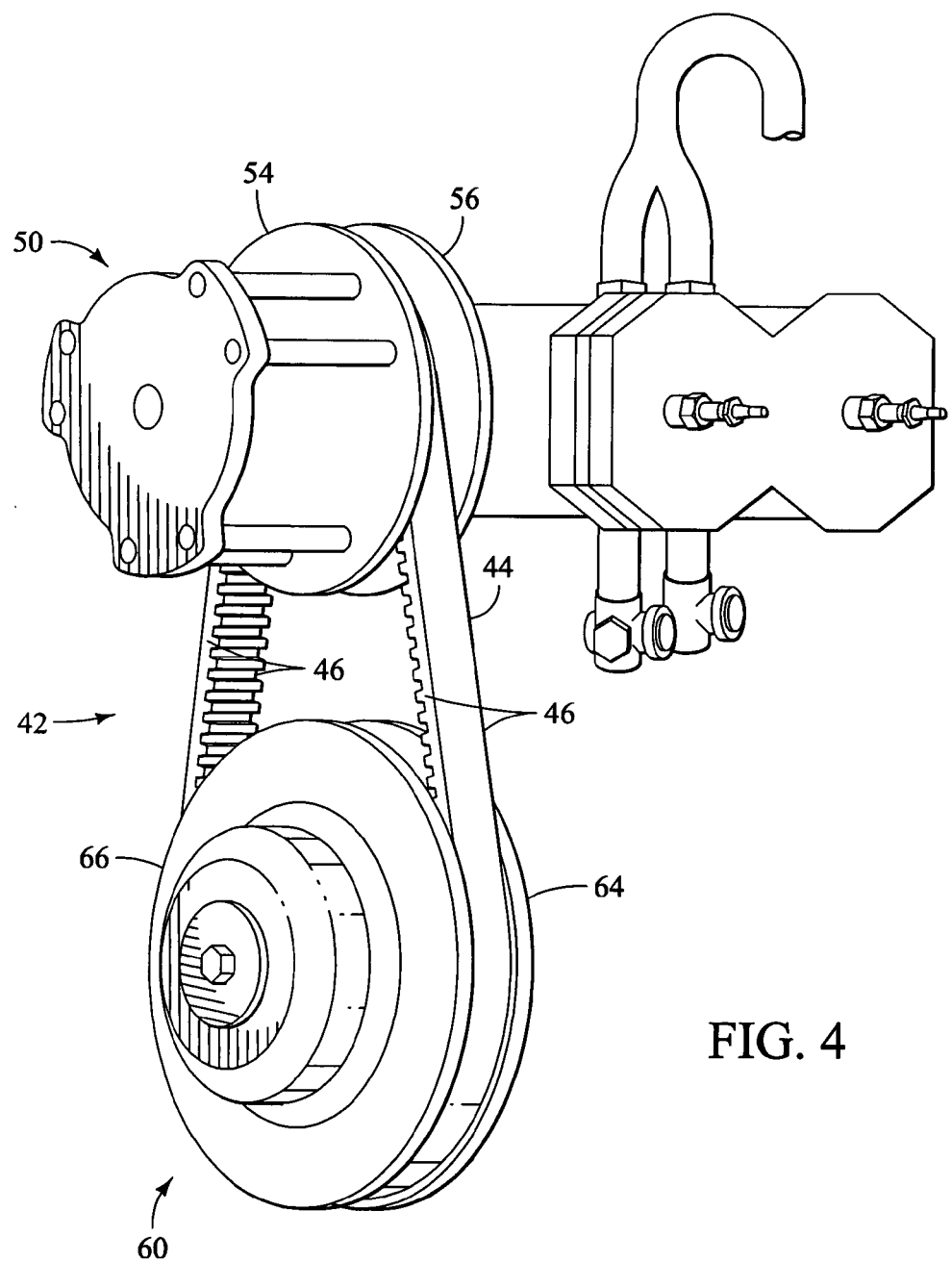
FIG. 4 is a perspective view of the continuous variable transmission of FIG. 3.

FIG. 4 is a perspective view of the CVT 42 of FIG. 1. The functioning of the CVT 42, in regards to the movement of the belt 44 about the drive clutch 50 and the driven clutch 60, is illustrated. The sheaves 54 and 56 of the drive clutch 50 are normally biased (such as by a spring) axially away from each other, and the sheaves 64 and 66 of the driven clutch 60 are normally biased axially toward each other (typically by a spring). When the vehicle is not in motion and the engine is started but not engaged, the drive clutch 50 rotates at idle speed, with the belt 44 positioned low in the V-shaped "pulley" of the drive clutch 50 and high in the V-shaped "pulley" of the driven clutch 60 (shown in FIG. 4). When the engine speed is increased above idle speed, a centrifugal mechanism in the drive clutch 50 causes the axially movable sheave 54 to move toward the axially stationary sheave 56, squeezing the belt 44 at contact surfaces 46. In turn, when the drive clutch 50 engages the belt 44, the belt 44 is subsequently rotated about the drive clutch 50 and the driven clutch 60 at an accelerated rate. Also, as the drive clutch 50 engages the belt 44, the belt 44 is pushed radially outwardly on the drive clutch. As a consequence, the belt 44 is pulled radially inwardly on the driven clutch 60, causing the axially movable sheave 64 of the driven clutch 60 to move axially away from the axially stationary sheave 66. Even though the belt 44 is typically comprised of a resilient material (e.g., rubber), the accelerated rotation of the belt 44, coupled with compressive forces exerted on the belt 44 sides by the axially movable sheave 64 and the axially stationary sheave 66 of the driven clutch 60, may cause a build-up of excessive heat on the belt 44. In particular, the build-up of heat may be quite high at the surfaces 46 where the belt 44 contacts with the axially movable sheave 64 and axially stationary sheave 66.

As previously mentioned, the material breakdown of the belt 44 is the net result of many factors, however, almost all of the factors tend to be derived from the belt 44 getting too hot, and essentially fatiguing to the point of breakdown. Therefore, in designing a CVT to increase the operational lifetime of the belt 44 that rides therein, it is believed that it would be best to create cooling in the driven clutch 60, in areas in contact with the belt 44 and in areas proximate to the belt 44. This cooling is done specifically by modifying the axially movable sheave 64 and axially stationary sheave 66 accordingly. However, it is also contemplated that these modifications could very well be applied in the case of the drive clutch assembly 50 and its corresponding sheaves 54 and 56. The exemplary embodiments that will be largely discussed will involve the driven clutch assembly 60. However, it is to be understood that the scope of the present invention is not limited to these exemplary embodiments.

Figure 5:
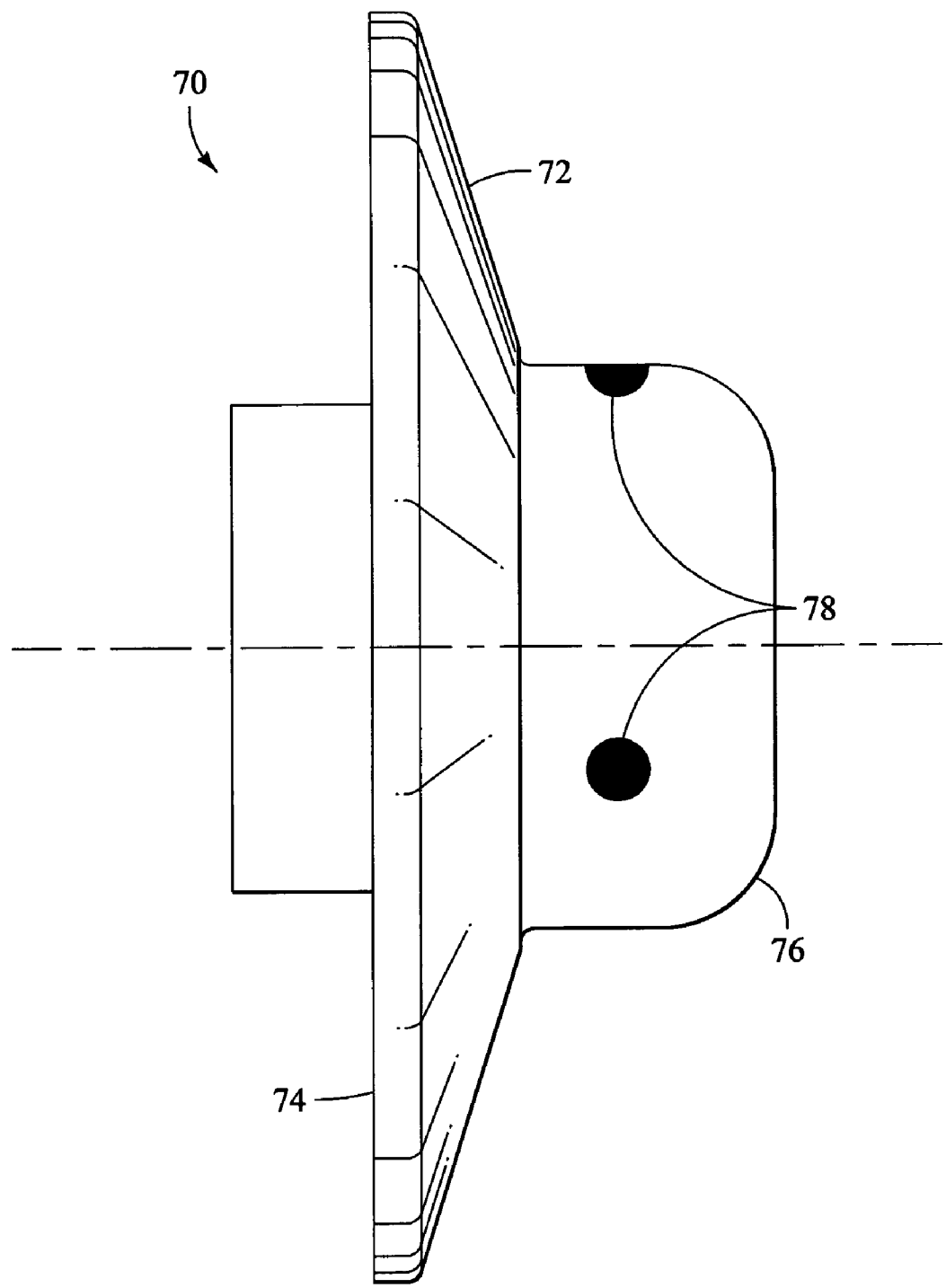
FIG. 5 is a side view of an axially movable sheave of a driven clutch illustrating an exemplary embodiment of the invention.

FIG. 5 is a side view of an axially movable sheave 70 of a driven clutch illustrating an exemplary embodiment of the invention. The axially movable sheave 70 has an inner face 72 and an outer face 74. A centrally located, generally rounded hub 76 extends axially from the inner face 72 of the sheave 70. In certain embodiments of this invention, the hub 76 includes at least one bore 78 running therethrough. Preferably, the at least one bore 78 is positioned along a side surface of the hub 76, and is oriented in a general radial direction from a central axis of the driven clutch. The number of bores 78 in the hub 76 is variable, and may be dependent on the specific design of the sheave 70, as will be discussed later. In certain embodiments, where a plurality of bores 78 are distributed about the central hub 76, the bores 78 are preferably distributed at generally equal angles about the respective central axis of the driven clutch. Each bore 78 is comprised of a generally circular aperture, and functions in expelling air that is funneled through the hub 76 from the outer face 74 of the sheave 70. As will be later illustrated with reference to FIG. 7, each bore 78 extends into the hub 76, through the axially movable sheave 70, and out the outer face 74 of the sheave 70.

Figure 6:
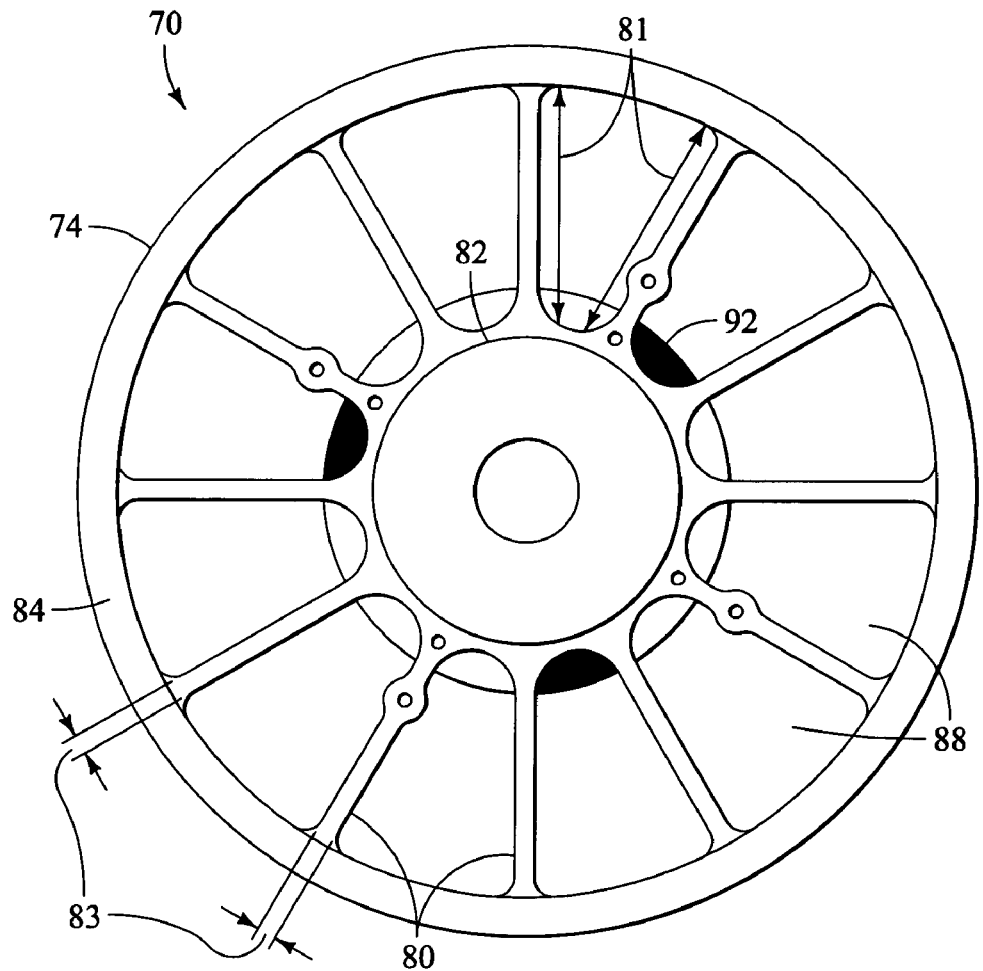
FIG. 6 is a plan view of an outer face of the axially movable sheave of FIG. 5.

FIG. 6 is a plan view of the outer face 74 of the axially movable sheave 70 of FIG. 5. A plurality of ribs 80 extends axially from the outer face 74 of the sheave 70. As shown, each rib 80 comprises a thin, straight-walled member that has a length dimension 81 that exceeds its width dimension 83, and extends radially from an inner edge of the sheave 70 (adjacent to a cam 82 of the driven clutch) to an outer edge 84 of the sheave 70. Also, each rib 80 is a molded portion of the sheave 70, with an inner axial surface of each rib 80 being integrally joined with the outer face 74 of the sheave 70, and an outer axial surface of each rib 80 being exposed. Each rib 80 ramps in height from a maximum at an inner radial end extending from the inner edge of the sheave 70 (adjacent to the cam 82) down to a minimum at an outer radial end extending to the outer edge 84 of the sheave 70. The plurality of ribs 80 is spatially positioned around the outer face 74 of the sheave 70 in a windmill-like pattern, wherein each rib 80 is generally separated from adjacently-lying ribs 80 by a substantially equal sheave surface area.

A cover plate 86 (shown in FIG. 7) typically fits over and is secured to the outer face 74 of the axially movable sheave 70. The cover plate 86 is generally comprised of sheet metal, but can be comprised of other like materials as well. When the cover plate 86 is secured over the outer face 74 of the axially movable sheave 70, a plurality of generally radially oriented air chambers 88 is defined between the cover plate 86 and the axially movable sheave 70. The quantity of air chambers 88 is related to the quantity of ribs 80, which serve to separate the air chambers 88 from one another. The cover plate 86 is preferably sized to substantially cover the plurality of air chambers 88. However, in other certain embodiments, the cover plate 86 may perhaps be segmented to only cover ½, or even ¼ of the plurality of air chambers 88. It is even contemplated that the cover plate 86 may be configured to only cover one air chamber 88. In certain particularly preferred embodiments of the invention, the cover plate 86 has an outer diameter that is substantially equal to the outer diameter of the outer face 74 of the axially movable sheave 70, and an inner diameter sized such that the cover plate 86 fits around the cam 82 of the driven clutch.

Figure 7:
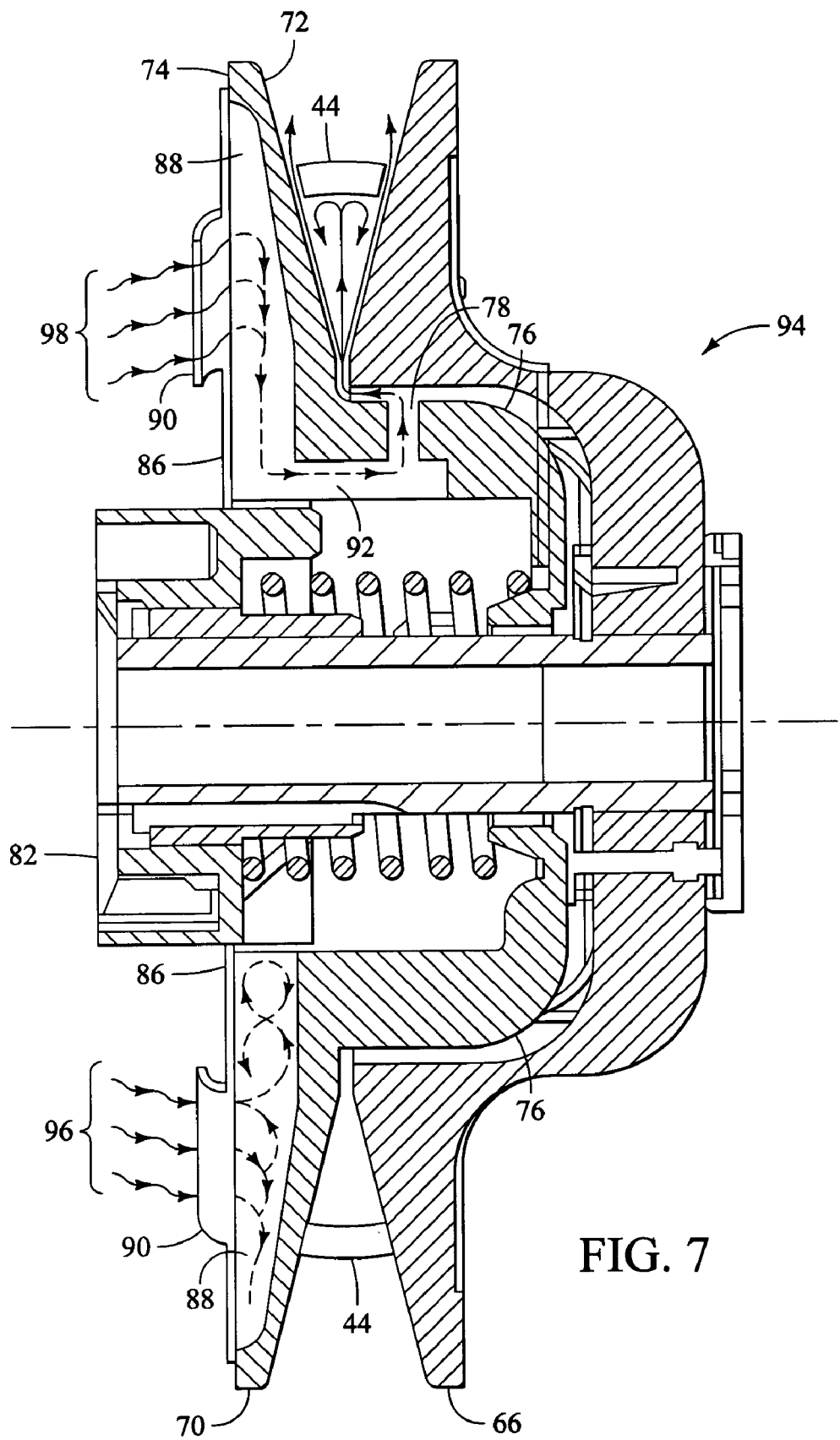
FIG. 7 is a cross-sectional side view of an exemplary embodiment of a driven clutch of the invention, showing an axially stationary sheave and the axially movable sheave of FIG. 5, and illustrating the movement of air through the axially movable sheave.

The cover plate 86 further has on its outside surface, oriented away from the outer face 74 of the axially movable sheave 70, at least one air scoop 90 (two of which are shown in FIG. 7). The at least one air scoop 90 is oriented to face in a direction of rotation of the axially movable sheave 70, and is adapted to bring outside air into at least one of the plurality of air chambers 88. The at least one air chamber 88 located below the at least one air scoop 90 may utilize the outside air to cool the axially movable sheave 70. Alternatively, the at least one air chamber 88 located below the at least one air scoop 90 may further include at least one air channel 92 that is formed into a narrowed portion of the at least one chamber 88 of the axially movable sheave 70. In reference to FIGS. 5 and 6, each of the air channels 92 (FIG. 6) is adapted to fluidly communicate with a corresponding bore 78 in the hub 76 (FIG. 5). Thus, the air channels 92, along with the bores 78, the air chambers 88, and the air scoops 90, provide for airflow from the outer face 74 to the inner face 72 of the axially movable sheave 70.

FIG. 7 is a cross-sectional side view of a driven clutch 94 of the invention utilizing the axially movable sheave 70 of FIGS. 5 and 6 and the axially stationary sheave 66 of FIGS. 3 and 4. When the driven clutch 94 is incorporated into a CVT, and the CVT is subsequently engaged, the driven clutch 94 rotates along with the drive clutch (not shown) and the belt 44 rides between the two clutches. With the rotation of the driven clutch 94, both the axially stationary sheave 66 and the axially movable sheave 70 may rotate in unison. As previously discussed, as the rotation is accelerated, the belt 44 is pulled radially inward on the driven clutch assembly 94, causing the axially movable sheave 70 of the driven clutch 94 to move axially away from the axially stationary sheave 66. As a result, the at least one bore 78 in the hub 76 of the axially movable sheave 70 may slide out from underneath the axially stationary sheave 66. When the bore is uncovered, airflow out of the bore is maximized. In turn, the cooling function of the invention is most efficient. However, as shown in FIG. 7, there can be airflow even when the axially stationary sheave 66 is disposed over the at least one bore 78.

When the axially movable sheave 70 rotates, the air scoops 90 on the outer surface of the cover plate 86 come in contact with the air at the outer face 74 of the axially movable sheave 70. As one of the air scoops 90 hits the air, the air scoop 90 collects the air. Once inside the air scoop 90, the air generally is driven into the corresponding air chamber 88 of the sheave 70 that is located below the air scoop 90. Once inside the air chamber 88, the air does one of two things.

If the air chamber 88 is without the air channel 92, such as the chamber 88 on the lower portion of the axially movable sheave 70 illustrated in FIG. 7, incoming air 96 has no path to follow, and is subsequently pushed out of the air chamber 88 by other scooped air being brought in. In this scenario, the incoming air 96 is used to cool the axially movable sheave 70. If the chamber 88 has the air channel 92, such as the chamber 88 on the upper portion of the axially movable sheave 70 illustrated in FIG. 7, incoming air 98 flows from the chamber 88 and subsequently, through the channel 92, which originates at the narrowed portion of the chamber 88 and continues through the axially movable sheave 70. The incoming air 98 flows through the channel 92, and then out one of the bores 78 in the hub 76 extending from the inner face of the axially movable sheave 70. In summary, the incoming air 98 starts at the outer surface of the cover plate 86 and ends up at the inner face 72 of the axially movable sheave 70. Subsequently, the incoming air 98 is forced out of the hub 76 into an area defined by the inner surfaces of the sheaves 70 and 66 to the sides, the hub 76 below, and the belt 44 above. As the amount of air 98 accumulates in the area underneath the belt 44, the air 98 begins to be driven outside the area. For example, air may pass between the belt 44 and the inner faces of both the axially stationary sheave 66 and axially movable sheave 70.

Thus, the air 98 that is circulated from the outer surface of the cover plate 86, through the sheave 70, and to the inner face 72 of the sheave 70 may act to cool the belt 44 as well as the environment proximate to the belt 44.

As illustrated in FIG. 7, the air 98 is channeled from the outer surface of the cover plate 86, through the axially moveable sheave 70, and to the inner face 72 of the sheave 70. In certain preferred embodiments, as detailed above, the air 98 travels through one of the air scoops 90 within the cover plate 86, into one of the air chambers 88 within the sheave 70, through the air channel 92 connected to the air chamber 88, and out one of the bores 78 contained in the hub 76. However, it is recognized that there are a variety of aspects that could be modified in channeling the air 98 from the outer face 74 of the sheave 70 to the inner face 72. For instance, it is disclosed that the incoming air 98 is collected by one of the air scoops 90 and driven into one of the air chambers 88. However, it is recognized that one of the air scoops 90 could instead drive the air 98 into a plurality of air chambers 88. On the other hand, a plurality of air scoops 90 could be utilized to drive the air 98 into a single air chamber 88. Finally, a plurality of air scoops 90 could be utilized to drive the air 98 into a plurality of air chambers 88. It is also detailed that the incoming air flows from an air chamber 88 to an air channel 92 located in the narrowed portion of the air chamber 88. Yet, it is recognized that the air chamber 88 could be connected to a plurality of air channels 92. In contrast, a plurality of air chambers 88 could be connected to a single air channel 92. Further, a plurality of air chambers 88 could be connected to a plurality of air channels 92. It is also mentioned that the air 98 is driven from the air channel 92 out through one of the bores 78 in the hub 76. Nevertheless, it is recognized that the air channel 92 could be connected to a plurality of bores 78 in the hub 76. In contrast, a plurality of air channels 92 could be connected to a single bore 78 in the hub 76. Finally, a plurality of air channels 92 could be connected to a plurality of bores 78 in the hub 76. In summary, a variety of ways may be used to transfer air from the outer surface of the cover plate 86 to the inner face 72 of the axially movable sheave 70 without deviating from the spirit and scope of the present invention.

In addition, while the at least one bore 78 is comprised of a circular aperture that is channeled to one of the air chambers 88 in the axially movable sheave 70 and remains a somewhat similar size throughout, it is fully contemplated that the at least one bore 78 may be of various other shapes or sizes and still be within the spirit of the invention. For example, each bore 78 may comprise a slot or rectangular shaped aperture and function just as well. Further, each bore 78 may vary in size from inlet opening at the air chamber 88 to outlet opening at the hub 76 such that the inlet is wider than the outlet, or the inlet is narrower than the outlet. Further, every bore 78 on the hub 76 may lead into substantially similarly sized conduits, or in contrast, every bore may lead into one of a plurality of differently sized conduits. While each bore 48 may not be described as such in the above-described embodiment, it is not done so as to limit the invention as such.

As previously discussed and illustrated in FIG. 4, as a vehicle accelerates, the rotation of the belt 44 is accelerated about the clutches 50 and 60. In addition, it has been mentioned that even though the belt 44 is comprised of a resilient material (e.g., rubber), the accelerated rotation, coupled with the compressive forces exerted on the belt 44 by the axially movable sheave 64 and the axially stationary sheave 66 of the driven clutch 60, may cause a build-up of excessive heat on the surfaces 46 of the belt 44 that contact the sheaves. Another consequence of the accelerated rotation of the belt 44 is that the belt may often slip on the inner faces of the sheaves of either clutch 50 or 60. This slippage generally causes a friction between the contact surfaces 46 of the belt 44 and the inner sheave faces of the clutches 50 and 60. This friction, in turn, generally causes a rise in temperature on the contact surfaces 46. If slippage between the belt 44 and the inner sheave faces of the clutches 50 and 60 occurs with enough frequency, the heat build-up on the belt contact surfaces 46 may lead to an overall breakdown of the belt 44.

Figure 8:
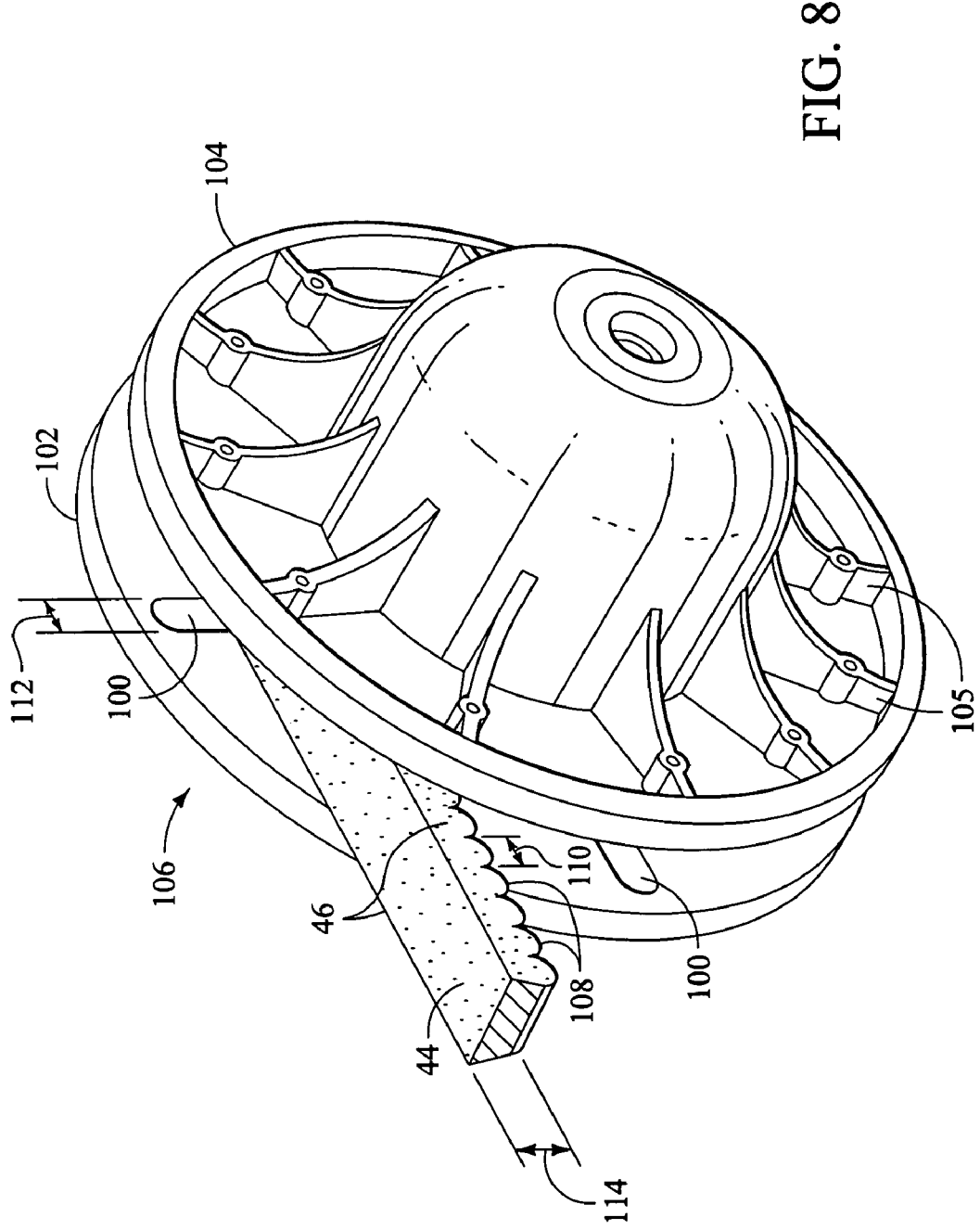
FIG. 8. is a perspective view of a driven clutch illustrating an exemplary embodiment of the invention.

The problem of belt 44 slippage can be reduced with the addition of at least one recessed channel placed on the inner surface of at least one of the axially movable and axially stationary sheaves of either the drive or driven clutch. A driven clutch 106 illustrating an exemplary embodiment of the invention is shown in FIG. 8. In certain preferred embodiments, an axially movable sheave 102 may have one recessed channel 100 for every two ribs (not shown) located on the opposite side of the sheave 102. Although while also not shown, a similar quantity of recessed channels 100 may additionally be located on the inner surface of an axially stationary sheave 104 for a corresponding quantity of ribs 105 located on the opposite side of the sheave 104. Each of the recessed channels 100 is comprised of a slotted groove or indentation and is preferably positioned on the sheave surface such that it is generally oriented perpendicular to the rotating direction of the belt 44. In reference to the central axis of the clutch, each of the recessed channels 100 extends radially from the axis. Each recessed channel 100 extends to an axial depth in the inner surface of the respective sheaves 102 and 104 without breaking through to the outer surfaces of the sheaves 102 and 104. Preferably, each recessed channel 100 remains a constant size throughout. In particularly preferred embodiments, the recessed channels 100 have side walls that are configured to be substantially perpendicular to the inner surface of the respective sheave.

In certain embodiments, the recessed channels 100 are positioned on the axially stationary sheave 104 to correspond to the positioning of the recessed channels 100 on the axially movable sheave 102 such that each corresponding pair of recessed channels 100 function together, as will be discussed. Much like a studded belt provides reduced-slip traction for a snowmobile in the snow, the recessed channels 100 on the sheaves 102 and 104 provide for similar reduced-slip traction between the belt 44 and the inner faces of the sheaves 102 and 104. Specifically, as the contact surfaces 46 of the belt 44 rotate into contact with the inner faces of the sheaves 102 and 104, outer edges of curved portions 108 (i.e., teeth) on the sides of the belt 44 are temporarily inserted into the recessed channels 100 (due to the compressive forces applied against the resilient belt 44 by the opposing sheave faces), forming a temporary coupling between the belt 44 and at least one of the sheaves 102 and 104. With the recessed channels 100 being configured with side walls substantially perpendicular to the inner surface of the respective sheave, the channels 100 are adapted such that one of the curved portions 108 of the belt 44 will not easily slide out of the corresponding recessed channel 100. In turn, with the temporary coupling, as the belt 44 is rotated about the sheaves 102 and 104, the belt 44 is less likely to slip across the inner surfaces of the sheaves 102 or 104 as previously described. With less belt 44 slippage, less frictional heat is generated.

However, as previously mentioned and illustrated in FIG. 7, the expelled air 98 from the hub 76 is intended to not only cool the lower surface of the belt 44, but also to pass between the belt 44 and the inner faces of the sheaves 102 and 104 to cool the other surfaces of the belt 44 as well as the environment proximate to the belt 44. With reduced slippage between the belt 44 and the inner surfaces of the sheaves 102 and 104, it would seem that there is less chance for the air 98 to pass therebetween. Yet, this potential problem is remedied by sizing the recessed channels 100 accordingly. By their design (i.e., length, width, and depth), the recessed channels 100 provide for the expelled air 98 from the hub 76 to be passed from an inner radial end to an outer radial end of the recessed channels 100, and in so doing, to be passed around the belt contact areas 46. As illustrated in FIG. 8, the curved portions 108 on the inner side of the belt 44 are substantially similar in width 110 to the width 112 of the recessed channels 100. Therefore, when the curved portions 108 of the belt 44 and the corresponding recessed channels 100 couple, one of the curved portions 108 will generally be inserted into one of the corresponding recessed channels 100. The recessed channels 100 are of a length, i.e., radial distance, that is greater than the thickness dimension 114 of the belt 44, i.e., the radial distance measured from an inner radial end to an outer radial end of the endless belt. Thus, the contact surfaces 46 of the belt 44 will not entirely block any of the recessed channels 100 when the belt contacts the inner face of the corresponding sheave. Further, the recessed channels 100 are of a great enough axial depth such that the expelled air 98 can pass from the inner radial end to the outer radial end of the recessed channels 100 without being impeded by the insertion of the curved portion 108 of the belt 44. In summary, by sizing the recessed channels 100 appropriately, one may not only provide a direct source for cooling the belt 44 and its proximate environment by allowing air to pass freely between the belt and the sheave surfaces 102 and 104, but also may provide an indirect source for cooling the belt 44 by reducing the amount of heat build-up on the belt itself in reducing slippage.

In addition, it is contemplated that the recessed channels 100 may function in cooling the belt 44 as well as the environment proximate to the belt 44 without the presence of the at least one bore 78 in the hub 76. It is recognized that the recessed channels 100, by their previously described design (i.e., length, width, and depth), may allow for adequate airflow from the area above the belt 44 (i.e., defined as the environment outside the clutch 106) to the area underneath the belt 44 (i.e., defined by the inner surfaces of the sheaves 102 and 104 to the sides, the hub 76 below, and the belt 44 above), and vice versa. As the driven clutch 106 rotates, the at least one recessed channel 100, located on at least one of the inner faces of the axially movable or axially stationary sheaves 102 and 104 respectively, can very well contact the air in the area above the belt 44 and subsequently channel the air to the area underneath the belt 44. As this process is repeated over and over by the continuing rotation of the driven clutch 106, the air channeled to the area underneath the belt 44 will accumulate to an excessive amount for the area. In turn, this would result in the at least one recessed channel 100 having an exhaustive effect as well by forcing the air outward from the area underneath the belt 44 to the area above the belt 44. As such, by providing the recessed channels 100 without the presence of the at least one bore 78 in the hub 76, one may not only provide a direct source for cooling the belt 44 and its proximate environment by allowing air to pass freely between the area above the belt 44 and the area below the belt 44, but also may provide an indirect source for cooling the belt 44 by reducing the amount of heat build-up on the belt itself in reducing slippage.

While in certain preferred embodiments, as described above, each of the recessed channels 100 is comprised of a slotted groove with certain width, length, and depth in the respective sheaves 102 and 104 and remains a constant size throughout, it is fully contemplated that the recessed channels 100 may be of various shapes or sizes and still be within the spirit of the invention. For example, each recessed channel 100 may be circular or rectangular is shape and function just as well. Further, each recessed channel 100 may comprise an outline of a shape, such as a circle or rectangular, and function just as well. Also, it is contemplated that each recessed channel may have differing widths 112 (i.e., larger or smaller than the outer width 110 of the curved portion 108 of the belt 44), differing radial lengths (i.e., equal to or smaller than the radial thickness 114 of the belt 44), and differing axial depths (i.e., not enabling air to pass from the inner radial end to the outer radial end of the recessed channels 100, or vice versa if applicable, because of being impeded by the insertion of the curved portion 108 of the belt 44). In this same light, it is contemplated each recessed channel 100 may vary in size from inner radial end to outer radial end such that the inner radial end is wider than the outer radial end, or the inner radial end is narrower than the outer radial end. Further, it is contemplated that each recessed channel 100 may not extend across the inner surface of a respective sheave in a straight, radial direction from the axis of the clutch, but may be angled, curved, or even segmented from the axis instead. While these differing shapes, sizes, and orientations for the recessed channels would generally still enable the sheaves to have non-slip surfaces, they are not included as a preferred embodiment of the invention since these differing shapes, sizes, and orientations may compromise the airflow efficiency through the recessed channels 100, as well as the efficiency of their non-slip function. However, it is not done so as to limit the invention as such. Further, the recessed channels 100 could be referenced with many different terms, such as indentations, grooves, cavities, pits, and the like. While the term "recessed channel" is used herein, it is recognized that different terms could have been used without deviating from the spirit and scope of the present invention.

In addition, the recessed channels 100 on any one sheave may all be comprised of similarly sized and oriented grooves as described above, however, in contrast, the channels 100 may also be comprised of a plurality of differently sized and oriented grooves. Finally, the number of recessed channels 100 per sheave may vary. While it is described that there is preferably at least one recessed channel 100 for every two ribs 105 on the disclosed sheaves, it is also contemplated having at least one recessed channel 100 for every rib 105 on the sheave as well as having a lesser number of recessed channels 100, including a contemplated embodiment of having only one recessed channel 100 on one of the sheaves. While each recessed channel 100 may not be described as such in the above-described embodiment, it is not done so as to limit the invention as such.

While a preferred embodiment of the present invention has been described, it should be understood that various changes, adaptations, and modifications may be made therein without departing from the spirit of the invention and the scope of the appended claims.

What is claimed is:

1. A continuously variable transmission comprising:
   a drive clutch rotatable about a central axis and having an input shaft;

a driven clutch rotatable about a central axis and having an output shaft;

an endless belt disposed about the drive and driven clutches, the drive and driven clutches each being comprised of opposing sheaves including an axially stationary sheave and an axially movable sheave, each sheave having an inner face and an outer face; and a clutch ventilation system comprising, for one sheave: a central hub extending axially from the inner face of the one sheave towards the opposing sheave, the central hub including a bore that provides an air path from the outer face of the one sheave through the one sheave to the inner face of the one sheave, the bore being positioned such that the bore is progressively uncovered by the opposing sheave as the axially moveable sheave slides from a first axial position to a second axial position.

2. The transmission of claim 1, wherein the bore is positioned along a side surface of the hub.

3. The transmission of claim 1, wherein the bore is oriented in a general radial direction from the respective clutch central axis.

4. The transmission of claim 1, wherein the one sheave is part of the driven clutch.

5. The transmission of claim 1, wherein the one sheave is axially moveable.

6. The transmission of claim 5, wherein the one sheave is part of the driven clutch.

7. The transmission of claim 5, wherein the one bore is positioned such that the bore is covered by the opposing sheave when the axially movable sheave is disposed in the first axial position, and the bore is not covered by the opposing sheave when the axially movable sheave is disposed in the second axial position.

8. The transmission of claim 1, wherein the central hub has a plurality of bores.

9. The transmission of claim 8, wherein the plurality of bores are distributed at generally equal angles about the respective clutch central axis.

10. The transmission of claim 1, wherein the one sheave has a plurality of generally radially oriented ribs extending axially from the outer face of the one sheave, the ribs being covered with a cover plate that together with the ribs and the outer face of the one sheave defines a plurality of generally radially oriented air chambers.

11. The transmission of claim 10, wherein the cover plate is sized to substantially cover the plurality of chambers.

12. The transmission of claim 10, wherein at least one of the air chambers is in fluid communication with the one bore by way of at least one air channel.

13. The transmission of claim 10, wherein the air path flows through one of the air chambers and one of the air channels.

14. The transmission of claim 10, wherein the cover plate has at least one air scoop located thereon generally facing in a direction of rotation of the one sheave, the at least one air scoop being adapted to bring outside air into at least one of the plurality of chambers.

15. The transmission of claim 1, wherein the continuously variable transmission is utilized on a snowmobile.

16. A continuously variable transmission comprising:

a drive clutch rotatable about a central axis and having an input shaft;

a driven clutch rotatable about a central axis and having an output shaft;

an endless belt disposed about the drive and driven clutches, the drive and driven clutches each being comprised of opposing sheaves including an axially stationary sheave and an axially movable sheave, each sheave having an inner face and an outer face; and a clutch ventilation system comprising, for one sheave, the one sheave being axially movable: a central hub extending axially from the inner face of the one sheave towards the opposing sheave, the central hub including a bore that provides an air path from the outer face of the one sheave through the one sheave to an outer face of the central hub, the one bore being positioned such that the bore is covered by the opposing sheave when the axially movable sheave is disposed in a first axial position and the bore is not covered by the opposing sheave when the axially movable sheave is disposed in a second axial position.

* * * * *